United States Patent
Hoff

(10) Patent No.: US 7,030,580 B2
(45) Date of Patent: Apr. 18, 2006

(54) MOTOR/GENERATOR TRANSIENT RESPONSE SYSTEM

(75) Inventor: Brian D. Hoff, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/740,520

(22) Filed: Dec. 22, 2003

(65) Prior Publication Data

US 2005/0134206 A1    Jun. 23, 2005

(51) Int. Cl.
  *H02P 7/00*    (2006.01)
(52) U.S. Cl. ............ 318/141; 318/445; 180/65.2; 180/65.3; 324/38; 324/177; 324/139
(58) Field of Classification Search .......... 318/141, 318/445, 18; 290/2–44; 324/139, 177, 143; 322/11, 17, 38, 44; 180/65.2, 65.3
  See application file for complete search history.

(56) References Cited

U.S. PATENT DOCUMENTS

| | | | | |
|---|---|---|---|---|
| 5,007,303 | A | * | 4/1991 | Okuzumi ............... 74/573 F |
| 5,081,365 | A | | 1/1992 | Field et al. |
| 5,561,363 | A | * | 10/1996 | Mashino et al. ............ 322/25 |
| 5,713,425 | A | * | 2/1998 | Buschhaus et al. ........ 180/65.2 |
| 6,005,297 | A | * | 12/1999 | Sasaki et al. ............ 290/4 C |
| 6,067,801 | A | * | 5/2000 | Harada et al. ............ 60/705 |
| 6,169,332 | B1 | | 1/2001 | Taylor et al. |
| 6,176,808 | B1 | * | 1/2001 | Brown et al. ............... 477/5 |
| 6,232,733 | B1 | * | 5/2001 | Obayashi et al. .......... 318/432 |
| 6,282,897 | B1 | * | 9/2001 | Paul ......................... 60/598 |
| 6,367,570 | B1 | * | 4/2002 | Long et al. ............. 180/65.2 |
| 6,392,311 | B1 | * | 5/2002 | Inaba et al. ............. 290/38 R |
| 6,437,456 | B1 | * | 8/2002 | Kimura et al. ........... 290/40 C |
| 6,483,197 | B1 | * | 11/2002 | Masberg et al. ......... 290/40 C |
| 6,612,386 | B1 | * | 9/2003 | Tamai et al. ............ 180/65.4 |
| 6,809,429 | B1 | * | 10/2004 | Frank .................... 290/40 C |
| 2001/0034571 | A1 | * | 10/2001 | Yoshino et al. ............. 701/22 |
| 2002/0072441 | A1 | * | 6/2002 | Inoue et al. ............... 474/18 |
| 2002/0123836 | A1 | * | 9/2002 | Komiyama et al. .......... 701/51 |
| 2002/0175011 | A1 | * | 11/2002 | Nogi et al. .............. 180/65.4 |
| 2002/0179047 | A1 | * | 12/2002 | Hoang et al. ............. 123/350 |
| 2003/0125850 | A1 | * | 7/2003 | Evans et al. ............... 701/22 |
| 2003/0189375 | A1 | * | 10/2003 | Raad ....................... 303/20 |
| 2003/0217876 | A1 | * | 11/2003 | Severinsky et al. ........ 180/65.2 |

* cited by examiner

*Primary Examiner*—David Martin
*Assistant Examiner*—Elias Hiruy
(74) *Attorney, Agent, or Firm*—Finnegan, Henderson, Farabow, Garrett & Dunner LLP

(57) ABSTRACT

A transient response system includes a power source operable to generate a power output and a transmission operatively coupled to the power source. The transient response system also includes a generator operatively coupled to the power source and a controller in communication with the generator and at least one of the power source and the transmission. The controller is operable to receive at least one input having a value indicative of a change in load on the power source and operable to cause the generator to remove power from the power output at a rate corresponding to the value of the at least one input.

7 Claims, 4 Drawing Sheets

MOTOR/GENERATOR TRANSIENT RESPONSE SYSTEM

TECHNICAL FIELD

The present invention relates generally to a transient response system, and more particularly to transient response system having a motor/generator.

BACKGROUND

Work machines, including on-highway trucks and other types of heavy machinery, are used for a variety of tasks. These work machines may include a transmission coupled to an engine such as, for example, a diesel engine, a gasoline engine, or a natural gas engine that provides the power to complete these tasks. The transmission may be a mechanical, hydro-mechanical, hydraulic, or electric transmission that transmits engine power to a traction device. A power load placed on the transmission by the traction device is transmitted to the engine. Power load changes, either requiring additional power or less power, may cause the engine to deviate from a desired operating range. Deviations from the desired speed range may result in poor efficiency, less production, increased wear on the engine, and operator dissatisfaction.

Work machines may include a flywheel to minimize the variations in engine speed caused by a change in the power load. The magnitude of the speed changes may be minimized by increasing the inertia of the flywheel. However, as flywheel inertia increases, responsiveness of the engine decreases. A conventional flywheel may be inefficient at providing a balance between minimizing engine speed fluctuations and allowing the engine to respond quickly to desired power changes. A range of flywheel sizes may be provided for a particular engine application to allow selection of flywheel size based on expected load changes. Unfortunately, this may result in increased parts, tooling, and production cost.

In an attempt to provide a flywheel offering improved response to a wider range of load changes, at least one variable inertial mass flywheel has been proposed. For example, U.S. Pat. No. 5,007,303 (the '303 patent) issued to Okuzumi on Apr. 16, 1991, describes a variable inertial mass flywheel having a main flywheel member coupled to an engine crankshaft and a sub-flywheel member separated from the main flywheel member by electrorheological fluid. The viscosity of an electrorheological fluid is proportional to the intensity of an electric field applied to the fluid. During power load fluctuations, the intensity of the electric field is changed to change the viscosity of the electrorheological fluid. As a result, the change in viscosity increases or decreases friction between the main flywheel and the sub-flywheel. During accelerations or decelerations, the intensity of the field is set low to minimize friction between the main flywheel and the sub-flywheel, thereby creating a low inertia flywheel that may respond quickly. During power load changes of high magnitude, the intensity of the field is set high to increase friction between the main flywheel and the sub-flywheel, thereby creating a high inertia flywheel that may offset the high magnitude changes in power load.

While, the variable inertial mass flywheel of the '303 patent may offer an improved response to a wider range of load changes, as compared to traditional fixed-mass flywheels, the flywheel of the '303 patent may be problematic. For example, the variable inertial mass flywheel may not efficiently use and/or dissipate the energy absorbed by the flywheel.

The present invention is directed to overcoming one or more of the problems set forth above.

SUMMARY OF THE INVENTION

In one aspect, the present disclosure is directed to a transient response system that includes a power source operable to generate a power output and a transmission operatively coupled to the power source. The transient response system also includes a generator operatively coupled to the power source and a controller in communication with the generator and at least one of the power source and the transmission. The controller is operable to receive at least one input having a value indicative of a change in load on the power source and operable to cause the generator to remove power from the power output at a rate corresponding to the value of the at least one input.

In another aspect, the present disclosure is directed to a method of operating a transient response system. The method includes driving a transmission with a power source, the power source operable to produce a power output. The method also includes sensing a load on the power source and identifying a change in the load on the power source. The method further includes controlling a generator to remove power from the power output at a rate corresponding to the value associated with the change in load on the power source.

DETAILED DESCRIPTION

Figure 1:
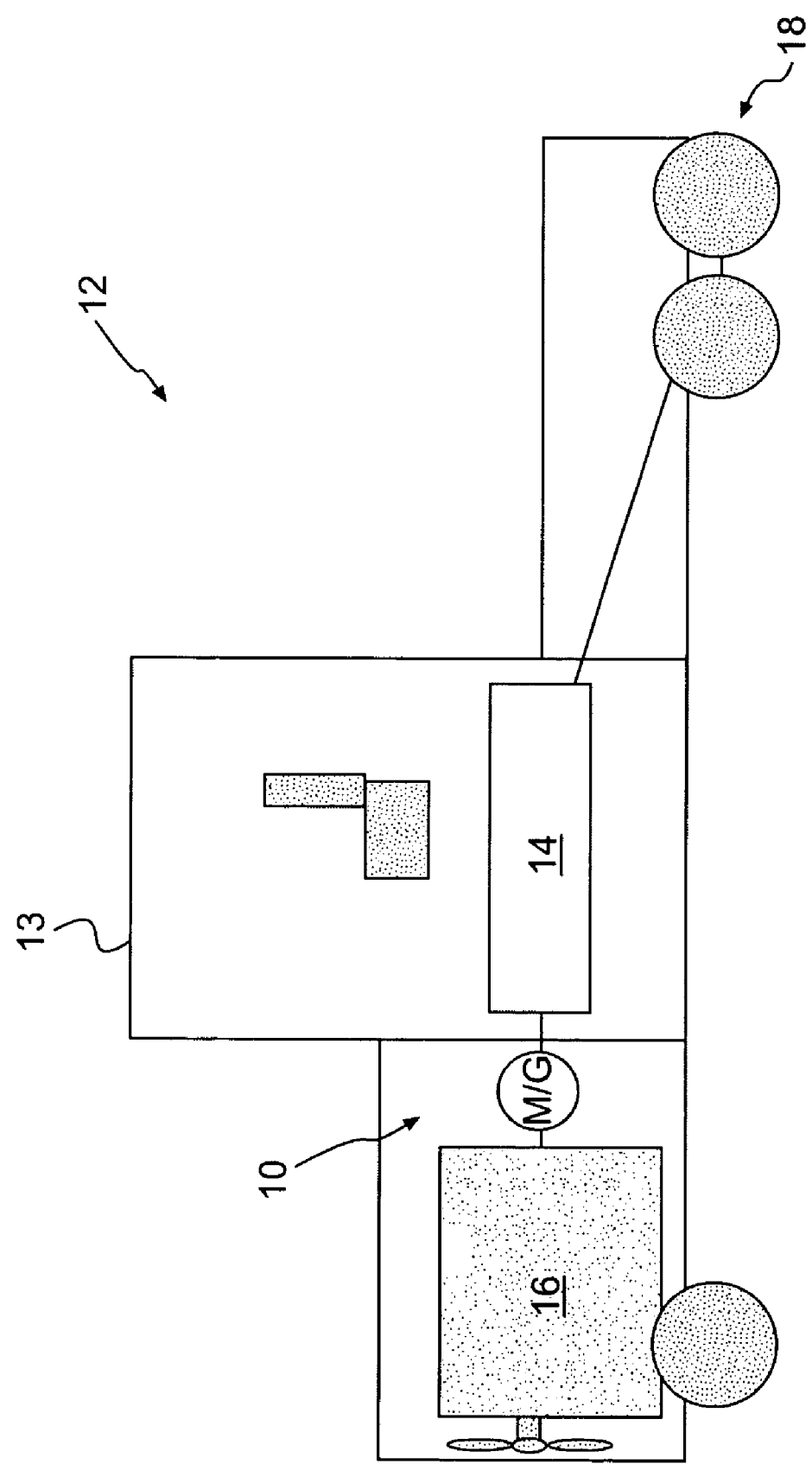
FIG. 1 is a diagrammatic illustration of a work machine having a transient response system according to an exemplary embodiment of the present invention.

FIG. 1 illustrates an exemplary embodiment of a transient response system 10 for a work machine 12 having a housing 13. The transient response system 10 is intended for use with an engine 16 and a transmission 14 connected to a traction device 18 of the work machine 12. Engine 16 may be a diesel engine, a gasoline engine, a natural gas engine, or any other engine readily apparent to one skilled in the art. Transmission 14 may be a mechanical, hydro-mechanical, electric, or any other transmission known in the art.

Figure 2:
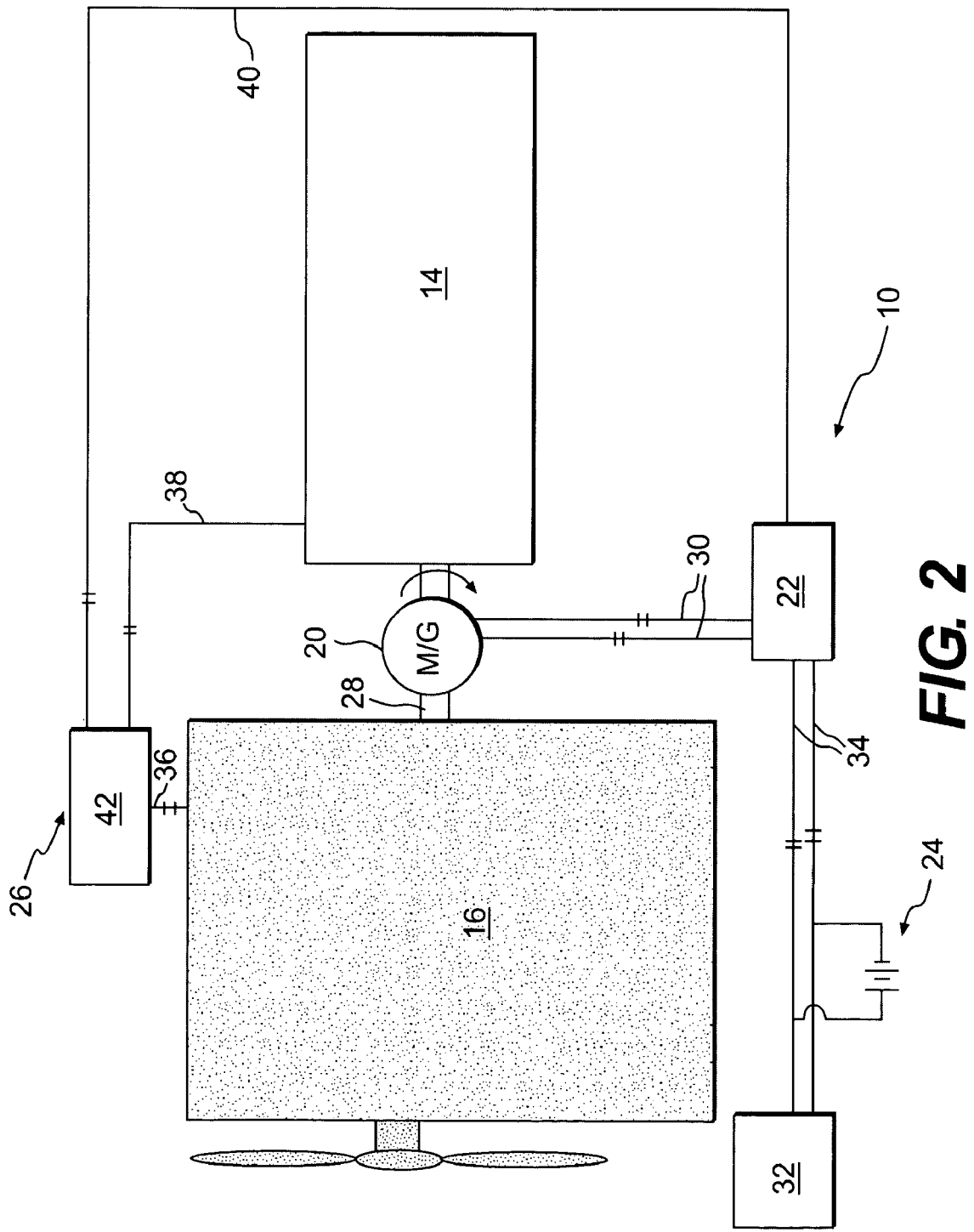
FIG. 2 is a schematic illustration of a transient response system according to an exemplary embodiment of the present invention.

As illustrated in FIG. 2, the transient response system 10 may include a motor/generator 20, a drive inverter 22, a power storage device 24, and a control system 26. Transient response system 10 may replace a conventional flywheel of engine 16. Alternately, transient response system 10 may also be used in conjunction with a conventional flywheel.

Motor/generator 20 may include a motor and a generator in a single unit. Alternatively, the motor and generator may be separated from one another. The motor/generator 20 may be connected to engine 16 by a crankshaft 28 of engine 16, or in any other manner known in the art. Motor/generator 20 may be configured to both drive engine 16 and be driven by engine 16. Motor/generator 20 may include a conventional starter/generator that is configured to drive engine 16 when engine 16 is already running as well as during a starting sequence.

It is also contemplated that the motor/generator may be absent and only a generator (not shown) included in transient response system 10. The generator may be connected to engine 16 by a crankshaft 28 of engine 16, or in any other manner known in the art. The generator may be configured to be driven by engine 16 to generate power.

Drive inverter 22 may be connected to motor/generator 20 via power lines 30. Drive inverter 22 may include various components including insulated gate bipolar transistors (IGBTs), microprocessors, capacitors, memory storage devices, and any other components that may be used for operating motor/generator 20. Other components that may be associated with drive inverter 22 include power supply circuitry, signal conditioning circuitry, and solenoid driver circuitry, among others.

Drive inverter 22 may direct power, generated by motor/generator 20, to power storage device 24 and to other power consuming devices 32 via power lines 34. Power storage device 24 may be any device (such as a battery) for storing power. Power consuming devices 32 may include, for example, one or more of an air conditioning unit, a heating unit, a resistive grid, lights, appliances, personal electronics, pumps, motors, and other electronic engine components and accessories known in the art.

Control system 26 may be in communication with engine 16, transmission 14, and drive inverter 22 via communication lines 36, 38, and 40 respectively. Control system 26 may include a controller 42, which may include components such as a memory, a secondary storage device, a processor, and any other component that may be used for running applications. Controller 42 may contain other components including power supply circuitry, signal conditioning circuitry, solenoid driver circuitry, and other appropriate circuitry known in the art.

Figure 3:
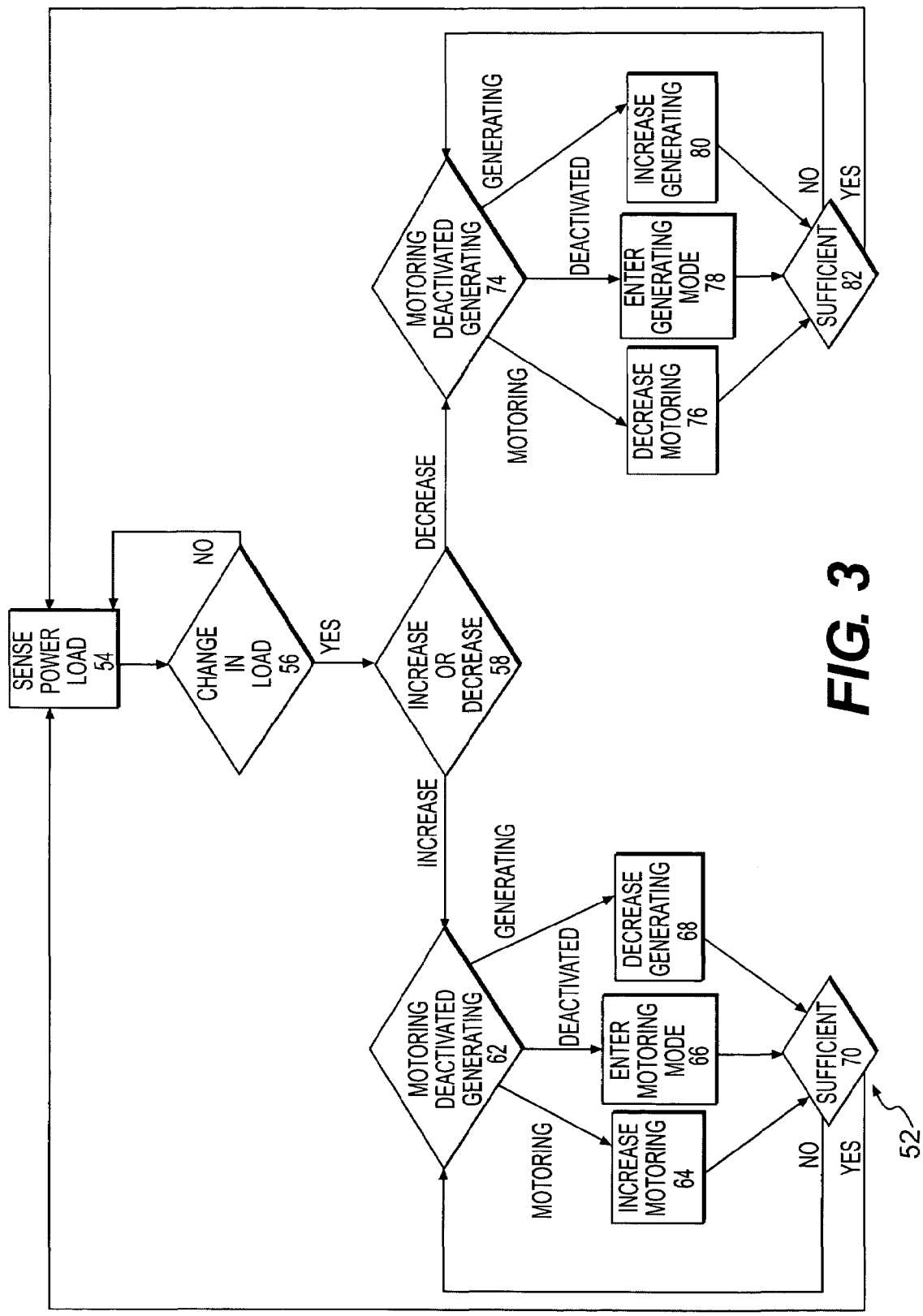
FIG. 3 is a flowchart illustrating a method of operation of the transient response system according to an exemplary embodiment of the present invention.
Figure 4:
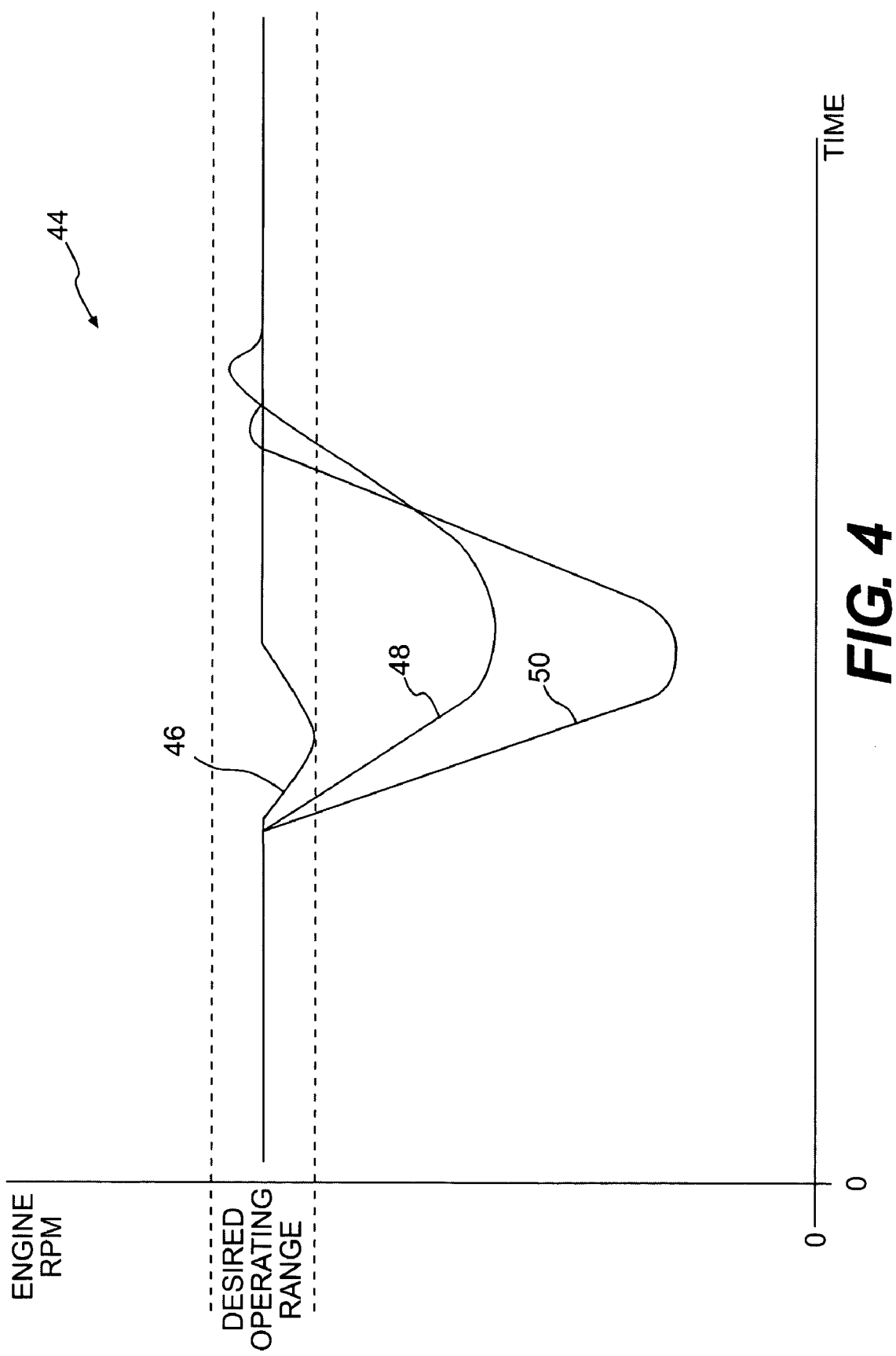
FIG. 4 is a graph comparing the response of the transient response system with conventional flywheels.

A flow chart 52 illustrated in FIG. 3 depicts the operation of the transient response system 10. A graph 44, illustrated in FIG. 4, depicts a response time comparison of transient response system 10 and conventional flywheels. These figures will be discussed in the following section to further illustrate the disclosed system and its operation.

INDUSTRIAL APPLICABILITY

The disclosed system may be applicable to any engine that requires dampening of transient power loads applied to the engine to minimize or prevent engine deviations outside of a desired operating range. For purposes of this disclosure, the term "desired operating range" includes those operating conditions that the work machine operator and/or work machine control system wants to achieve and/or maintain such as, for example, engine speed. Deviations from this desired operating range may result in, for example, increased fuel consumption, increased exhaust emissions, increased engine temperatures, decreased machine productivity, operator dissatisfaction, and/or decreased responsiveness.

Deviations from the desired operating range may be experienced when sudden changes in power load experienced by traction device 18 are transferred by transmission 14 or other engine powered devices to engine 16. Engine 16 may include various systems (not shown) working in combination with each other to respond to the power load. Such systems may include, for example, fuel delivery systems, air induction systems, control systems, combustion systems, and others known in the art. Each of these systems may have an associated response time lag. The combined response time lags of each system result in a total response time lag of engine 16. The response time lag of engine 16 is a factor that may determine whether power load changes cause deviations from the desired operating range to occur.

Work machine 12, as illustrated in FIG. 1, may utilize transient response system 10 to dampen sudden changes in power load transmitted to engine 16 from transmission 14 or other engine powered devices. Transient response system 10 may determine a change in the power load placed on the engine 16 and operate motor/generator 20 to change the power output of engine 16 in response to the sudden change in power load. While motor/generator 20 is responding to the change in power load, another power source (not shown) may supply the electrical requirements of work machine 12. Transient response system 10 may enable engine 16 to respond more quickly to a sudden change in power load than if engine 16 included only a traditional flywheel. Transient response system 10 may, therefore, decrease the likelihood of engine 16 deviating from the desired operating range.

Flow chart 52 of FIG. 3 depicts the operation of transient response system 10. At step 54, controller 42 senses the power load applied to engine 16. Controller 42 may monitor the change in power load that transmission 14 has transmitted or will transmit to engine 16. For example, controller 42 may sense a change in fluid pressure within a hydraulic transmission or a change in a speed command signal sent to an electric transmission. Sensing the fluid pressure or speed command signal in transmission 14 may indicate a change in power load before the change is transmitted to engine 16. Controller 42 may also sense an engine speed deviation, which may be an indication that a change in power load has already been transmitted to engine 16.

In step 56, controller 42 may determine whether a change in power load has occurred or will occur. If a change in power load has occurred or will occur, control continues to step 58 where controller 42 determines whether the change in power load is an increase or a decrease in power load.

If the change in power load is an increase, control continues in step 62, where controller 42 determines the mode in which motor/generator 20 is currently operating. If motor/generator 20 is operating in a motoring mode (i.e., adding power to the power output by driving engine 16), control commences to step 64, where motoring of motor/generator 20 is increased to add power supplied to the power output of engine 16. If motor/generator 20 is deactivated (i.e., neither absorbing nor adding substantial power with motor/generator 20), control commences to step 66, where motor/generator 20 is caused to enter the motoring mode to supply power to the power output of engine 16. If motor/generator 20 is operating in a generating mode (i.e., absorbing power from the power output by driving motor/generator 20 with engine 16), control commences to step 68, where the generating function of motor/generator 20 decreases to reduce the power diverted from the power output of engine 16. As a result of each of steps 64, 66, and 68, power may be added to the power output of engine 16 to offset the increase in power load.

The motoring mode and generating mode of motor/generator 20 will now be explained in further detail. When in the motoring mode, power from energy storage device 24, for example, may be directed to motor/generator 20 to cause motor/generator 20 to apply torque to engine crankshaft 28, thereby adding power to the power output of engine 16. The power directed to motor/generator 20 may also be supplied by another power source (not shown), such as an auxiliary engine. In the motoring mode, motor/generator 20 may be used to crank engine 16 when starting or to add power to crankshaft 28 when engine 16 is already running.

In the generating mode motor/generator 20 may be driven by engine 16 to generate power for various purposes. When in the generating mode, a portion of the mechanical power output of engine 16 may be converted by motor/generator 20 to electrical power. The generated electrical power may be directed to energy storage device 24 and to other power consuming devices 32 such as, for example, an air-conditioner, heating unit, resistive grid, lights, appliances, personal electronics, and other accessories. When motor/generator 20 is in the generating mode, power from the power output of engine 16 may be diverted from transmission 14 by motor/generator 20.

After steps 64, 66, or 68, control continues to step 70, where controller 42 determines if the actions of steps 64, 66, or 68 were sufficient to accommodate the increase in power load. This may be accomplished by monitoring the inputs from the transmission and engine in the same manner as step 54 described above. If the actions of steps 64, 66, or 68 were insufficient, control loops back to step 62. If the actions of steps 64, 66, or 68 were sufficient, control loops back to step 54.

Returning to step 58, if controller 42 determines that the change in power load is a decrease, control continues to step 74. During step 74, as described above for step 62, controller 42 determines which mode motor/generator 20 is operating in.

If motor/generator 20 is operating in a motoring mode, control commences to step 76, where motoring of motor/generator 20 decreases and less power is supplied to the power output of engine 16. If motor/generator 20 is deactivated, control commences to step 78, where motor/generator 20 is caused to enter the generating mode to divert power from transmission 14 to motor/generator 20. If motor/generator 20 is operating in a generating mode, control commences to step 80, where generating by motor/generator 20 increases to increase the power diverted from transmission 14 by motor/generator 20. As a result of steps 76, 78, and 80, the power output of engine 16 directed to transmission 14 prior to the power load decreases, thereby offsetting the decrease in power load.

After steps 76, 78, or 80, control continues to step 82, where controller 42 determines if the actions of steps 76, 78, or 80 were sufficient to accommodate the decrease in power load. This may be accomplished by monitoring the inputs from the transmission and engine in the same manner as step 54 described above. If the actions of steps 76, 78, or 80 were insufficient, control loops back to step 74. If the actions of steps 76, 78, or 80 were sufficient, control loops back to step 54.

FIG. 4 illustrates the performance of transient response system 10 relative to conventional flywheels. A curve 46 represents the response time of transient response system 10. A curve 48 represents the response time a high-inertia flywheel. A curve 50 represents the response time of a low-inertia flywheel. As illustrated in FIG. 4, transient response system 10 may cause engine 16 to deviate less from the desired operating range than a high inertia flywheel. As further illustrated in FIG. 4, transient response system 10 responds more quickly than a low inertia flywheel. The stability and responsiveness that transient response system 10 may add to engine 16 can improve efficiency, production, and life of both engine 16 and work machine 12.

It will be apparent to those skilled in the art that various modifications and variations can be made to the disclosed transient response system without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A transient response system, comprising:
   a power source operable to generate a power output;
   a transmission operatively coupled to the power source;
   a generator operatively coupled to the power source; and
   a controller in communication with the generator and at least one of the power source and the transmission, the controller operable to receive at least one input having a value indicative of a change in load on the power source and operable to cause the generator to remove power from the power output at a rate corresponding to the value of the at least one input and in such a manner to dampen transient power loads applied to the power source by removing less power from the power output in response to an increase in load on the power source;
   wherein the at least one input includes a signal corresponding to a fluid pressure of the transmission.

2. A transient response system, comprising:
   a power source operable to generate a power output;
   a transmission operatively coupled to the power source;
   a generator operatively coupled to the power source; and
   a controller in communication with the generator and at least one of the power source and the transmission, the controller operable to receive at least one input having a value indicative of a change in load on the power source and operable to cause the generator to remove power from the power output at a rate corresponding to the value of the at least one input and in such a manner to dampen transient power loads applied to the power source by removing less power from the power output in response to an increase in load on the power source;
   wherein the at least one input includes a motor command signal of the transmission.

3. A transient response system, comprising:
   a power source operable to generate a power output;
   a transmission operatively coupled to the power source;
   a generator operatively coupled to the power source;
   a controller in communication with the generator and at least one of the power source and the transmission, the controller operable to receive at least one input having a value indicative of a change in load on the power source and operable to cause the generator to remove power from the power output at a rate corresponding to the value of the at least one input and in such a manner to dampen transient power loads applied to the power source by removing less power from the power output in response to an increase in load on the power source;
   a motor operatively coupled to the power source, wherein the controller is in communication with the motor and operable to cause the motor to add power to the power output at a rate corresponding to the value of the at least one input; and
   a second power source configured to power the motor when the motor drives the power source.

4. A method of operating a transient response system comprising:

driving a transmission with a power source, the power source operable to produce a power output;
sensing a load on the power source;
identifying a change in the load on the power source; and
controlling a generator to remove power from the power output at a rate corresponding to a value associated with the change in load on the power source and in such a manner to dampen transient power loads applied to the power source by removing less power from the power output in response to an increase in load on the power source;
wherein the value associated with the change in load on the power source includes a value of a signal corresponding to a fluid pressure of the transmission.

5. A method of operating a transient response system comprising:
driving a transmission with a power source, the power source operable to produce a power output;
sensing a load on the power source;
identifying a change in the load on the power source; and
controlling a generator to remove power from the power output at a rate corresponding to a value associated with the change in load on the power source and in such a manner to dampen transient power loads applied to the power source by removing less power from the power output in response to an increase in load on the power source;
wherein the value associated with the change in load on the power source includes a value of a motor command signal of the transmission.

6. A work machine comprising:
a housing;
a traction device supporting the housing;
a power source operable to generate a power output;
a transmission operatively coupled to the power source;
a generator operatively coupled to the power source;
a controller in communication with the generator and at least one of the power source and the transmission, the controller operable to receive at least one input having a value indicative of a load on the power source and operable to cause the generator to remove power from the power output at a rate corresponding to the value of the at least one input and in such a manner to dampen transient power loads applied to the power source by removing less power from the power output in response to an increase in load on the power source; and
wherein the at least one input includes a signal corresponding to a fluid pressure of the transmission.

7. A work machine comprising:
a housing;
a traction device supporting the housing;
a power source operable to generate a power output;
a transmission operatively coupled to the power source;
a generator operatively coupled to the power source;
a controller in communication with the generator and at least one of the power source and the transmission, the controller operable to receive at least one input having a value indicative of a load on the power source and operable to cause the generator to remove power from the power output at a rate corresponding to the value of the at least one input and in such a manner to dampen transient power loads applied to the power source by removing less power from the power output in response to an increase in load on the power source; and
wherein the at least one input includes a motor command signal of the transmission.

* * * * *